United States Patent
Flood et al.

[11] 3,715,799
[45] Feb. 13, 1973

[54] METHOD FOR FLEXIBLE PIPE WELDING

[75] Inventors: Edgar M. Flood, Paducah; William H. Green, Hickory, both of Ky.

[73] Assignee: Weld-Eze, Inc., Paducah, Ky.

[22] Filed: Nov. 17, 1970

[21] Appl. No.: 90,403

[52] U.S. Cl. ..................29/475, 29/237, 228/32, 228/45
[51] Int. Cl. ..........................B23k 31/02
[58] Field of Search .....285/138, 286; 29/475, 477.3, 29/477.7, 237; 228/25, 29, 32, 45

[56] References Cited

UNITED STATES PATENTS

| | | | |
|---|---|---|---|
| 2,635,572 | 4/1953 | Hesterman | 113/35 |
| 3,132,416 | 5/1964 | Hait | 29/429 |
| 3,425,118 | 2/1969 | Dobell et al. | 29/477.3 |
| 3,487,537 | 1/1970 | Lombardi | 29/477.7 |

*Primary Examiner*—J. Spencer Overholser
*Assistant Examiner*—R. J. Craig
*Attorney*—Lowe & King

[57] ABSTRACT

Method and apparatus are disclosed for welding a pipe extension to a flexible, elongated pipe or hose wherein one end of the pipe is held upright for welding and the other end of the pipe is supported at an angle, such as on a horizontal surface of a cooperating support. The complete pipe including both ends and the intermediate angular section are rotated at substantially constant speed while a bead of weld material is applied in the weld area to give a uniform, leakproof weld. Since the one end of the pipe is upright, the extension may be rested on the end face without clamping and the welding rod is held stationary during welding. The clamp means for holding the welded end of the pipe is carried by a concentric support tube and rotatable cap assembly through which the pipe passes; the cap being stabilized by top and bottom bearings. The clamp includes opposed pivotal jaws on the annular top wall of the rotating cap; the jaws being tightened by screw means at the opposite end. Two-piece split collars are selected to roughly correspond to the outer dimension of the pipe. A fixed chain on the cap is used to drive the same from a motor driven sprocket, which combination retains the cap captive in the axial direction. A pedestal mount adaptor may be used for large diameter pipe.

5 Claims, 6 Drawing Figures

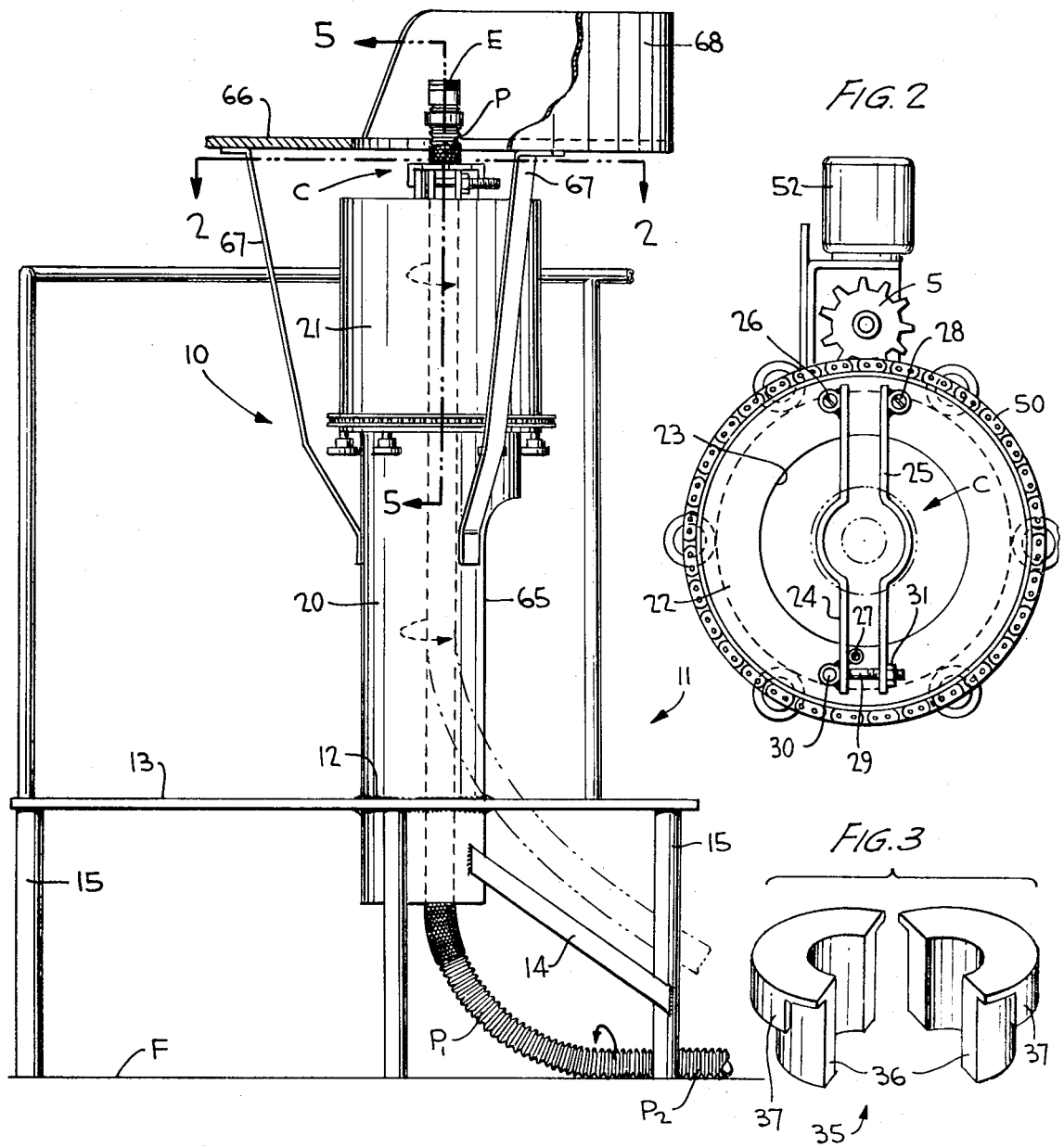

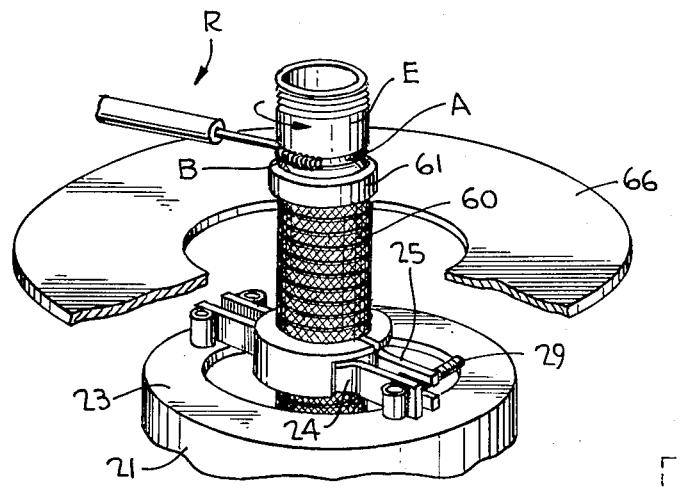
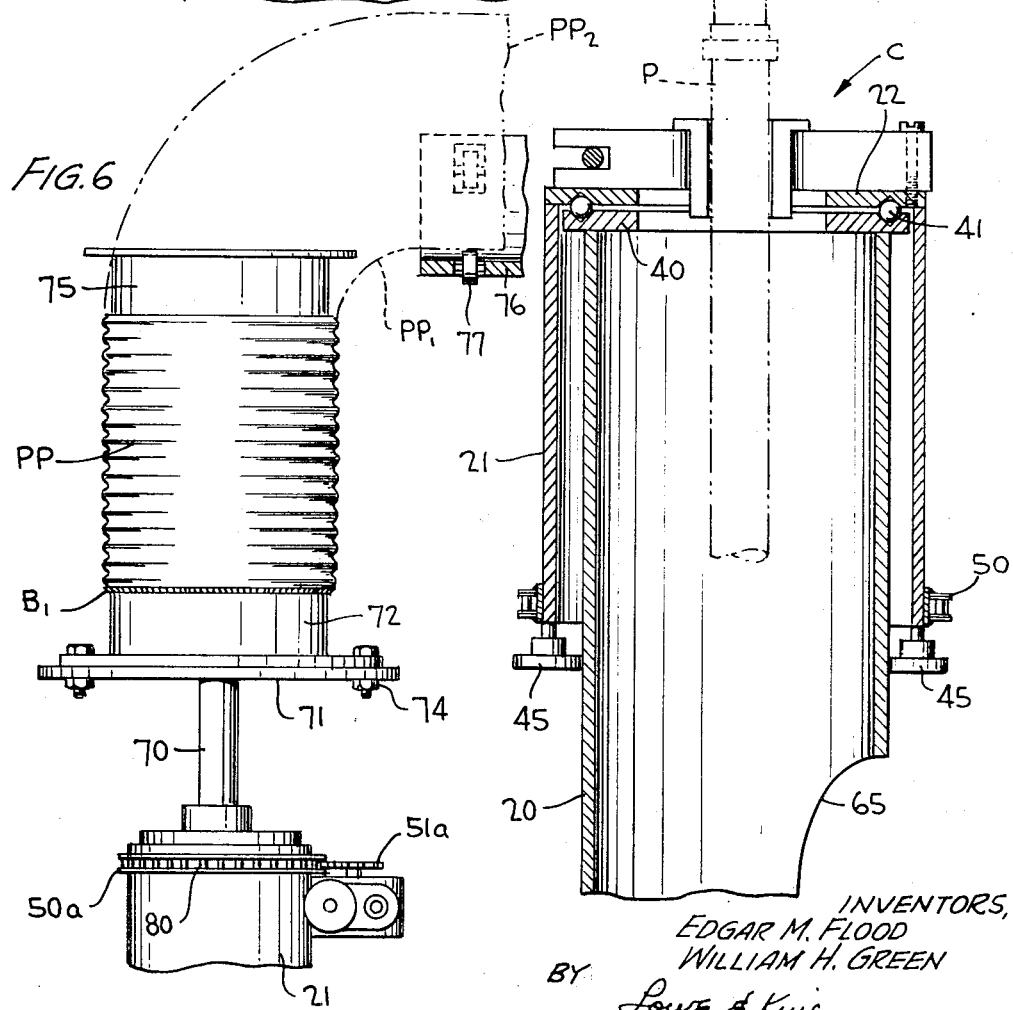

METHOD FOR FLEXIBLE PIPE WELDING

The present invention relates to welding, and more particularly, to an improved method and apparatus for welding flexible pipe.

BACKGROUND OF THE INVENTION

The use of flexible pipe or hose for fluid transfer has become very popular in recent years, especially in industrial processing plants. The flexible pipe is usually fabricated of stainless steel, bronze, Teflon plastic, or other strong, corrosion resistant material, and may be fabricated with a plurality of pleats extending around the girth of the pipe. The pipe is flexible by virtue of the pleats expanding on one side and contracting on the other side (in accordion fashion) as the pipe is bent through an angle. The pipe is usually covered with a protective metal fabric or wire braid. The more notable advantages of flexible pipe include (1) the ability to extend along a tortuous path without the necessity for forming expensive and leakage-prone joints, and (2) the isolation of mechanical forces and vibrations between the two connected points.

The flexible pipe must, of course, be provided with a conventional coupling at each end in order to be interconnected with the fluid system. These couplings, usually in the form of a conventional nipple (male part) or socket (female part) or cooperating flanged collars at both ends, must be in some manner welded to the body of flexible pipe. This fabrication of flexible pipe ready for installation with couplings at both ends, is most expediently done on a custom basis by industrial equipment and part distributors at spaced locations around the country because of the virtually infinite number of couplings and the variation in lengths required.

Heretofore, there has not been a simple and efficient machine or method adaptable for use in custom fabrication of flexible pipe. Insofar as we are aware, fabrication has been performed in all such instances with makeshift methods, such as tying the flexible pipe to any available stationary support, tack welding the coupling in position on the end face of the pipe and then applying a bead of weld material around the periphery of the pipe by physical movement of the welding rod around the girth just as in other conventional methods of welding. Such a method suffers from inefficiency in both the time required to complete the process and in the quality of the weld obtained. With regard to the latter, it is extremely difficult to obtain a uniform, high quality weld needed for the high pressure application to which industrial piping is subjected by free hand movement of the welding rod since a totally steady hand and uniform forward movement is virtually impossible.

OBJECTIVES OF THE INVENTION

Accordingly, it is one object of the present invention to provide a simple method and apparatus for welding pipe extensions or couplings to a length of flexible pipe.

It is still another object of the present invention to provide a method and apparatus for welding flexible pipe wherein the welded end is positioned upright and the other end of the pipe is supported at an angle; the pipe including both ends and the intermediate angular section being rotated at substantially constant speed for applying a uniform bead of weld material.

It is still another object of the present invention to provide an apparatus including a stationary tube support Through which the pipe passes and a clamp mounted on a concentric rotating cap, as a fixture for flexible pipe.

BRIEF DESCRIPTION OF THE INVENTION

To briefly explain the inventive method and apparatus, it can be said that a pipe coupling is welded to an elongated, flexible pipe by rotating the end of the pipe being welded about a substantially vertical axis with the pipe coupling or extension being positioned upright on the end face of the pipe. Advantageously, the pipe is supported at the other end at an angle to the vertical axis and preferably along a horizontal surface whereby the height of the welding fixture does not limit the length of the pipe that may be welded. Both ends of the pipe and the intermediate angular section are rotated at substantially constant speed to give a uniform weld; it being understood that the intermediate angular section is constantly and smoothly flexing during rotation to maintain the same angular relationship at all rotational positions.

Since the end of the pipe being welded is positioned in an upright manner by the fixture, the pipe extension or fitting may be conveniently positioned on top of the pipe in face-to-face contact without additional clamping means. The formation of the weld bead is automatically governed by the constant rotating action of the pipe and is thus not subject to human error so that the weld is always uniform.

In accordance with the invention, the support for the excess length of pipe is preferably a horizontal surface, such as the floor, so that the pipe rests free under the force of gravity. The fixture is preferably mounted on a stand that is positioned on the floor. In the instance where relatively large diameter pipes are welded, a pedestal adaptor is positioned in the clamp instead of the pipe, with the coupling or pipe extension being mounted on the pedestal and the other end of the pipe extending upwardly or resting in an overhead trough thereby also allowing free rotation.

The clamp for the pipe is mounted on a concentric carrier cylinder having bearing means at the top and the bottom to cooperate with a stationary support thereby assuring lateral stability of the clamped pipe. The clamp itself is preferably formed with at least one pivotal jaw and a tightening bolt to connect the free end of the jaws; a two-piece split collar being utilized to roughly adapt the clamp to various dimension pipe. The drive means includes a chain fixed to the outer periphery of the cylinder, and a sprocket and drive motor assembly to engage the same; the teeth of the sprocket serving to hold the cylinder captive in the axial direction by engagement with the lateral links of the chain.

Still other objects and advantages of the present invention will become readily apparent to those skilled in this art from the following detailed description, wherein there have been shown and described only the preferred embodiments of the invention, simply by way of illustration of the best modes contemplated for carrying out the invention. As will be realized, the invention is capable of other and different embodiments, and its several details are capable of modification in various obvious respects, all without departing from the inven-

BRIEF DESCRIPTION OF THE DRAWINGS

FIG. 1 is a side view of the welding fixture of the present invention mounted on a stand and operating on a flexible pipe;

FIG. 2 is a cross-sectional view along line 2—2 of FIG. 1 looking from above the fixture;

FIG. 3 is an enlarged perspective view of the two-piece adaptor collar for the clamp of the fixture;

FIG. 4 is a perspective view with parts cut away for clarity showing the welding operation in accordance with the features of the method of the present invention;

FIG. 5 is a cross-sectional view taken along line 5—5 of FIG. 1 showing the support tube and rotating cap of the fixture; and FIG. 6 is a side view showing another embodiment of the fixture with a pedestal adaptor for welding relatively large diameter pipe.

DETAILED DESCRIPTION OF THE PREFERRED EMBODIMENTS

Making reference to FIG. 1 of the drawings, a welding fixture 10 is shown mounted on a stand 11 that is positioned on a floor F. The fixture 10 is suitably held in an upright position by attachment at weld area 12 to platform 13 and suitable braces 14 extending to legs 15. The welding operator stands or sits on the platform to operate the fixture, as will be more fully apparent from the discussion below.

The fixture 10 comprises a stationary support tube 20 and a rotating cylinder or cap 21 mounted for rotation about the top of said tube 20. The upper or end wall 22 of the cap 21 is annular in shape; i.e., a central opening 23 is provided in the upper wall 22 (see FIG. 2). A clamp C mounted so as to span the opening 23 includes opposed jaws 24, 25 that engage the end of pipe P to be welded. The excess or remainder length of the pipe includes an intermediate angular section $P_1$ and the opposite end $P_2$, all of which rotates during welding by the rotating force transmitted through the clamp, as will be seen later. One jaw may be fixedly secured to wall 22 by suitable fasteners 26, 27 adjacent the ends. The other jaw 25 is pivotally supported at one end by a fastener 28 thus making said jaw free to pivot away from the opposed jaw 24 to open the clamp. A tightening bolt 29 is mounted on the stationary jaw 24 about a pivot joint 30 and extends through a slot in the free end of the jaw 25 (see FIG. 4). A nut 31 is applied to bring the jaws toward each other to effect tightening about the pipe P.

So that various sized pipe may be held in the clamp C, two-piece adaptor collars, such as the collar shown in FIG. 3 and generally designated by the reference numeral 35, may be employed. The body portions 36 of the collar have an outside diameter to fit the semicircular central portions of the jaws 24, 25, whereas the inside diameter is selected to approximately fit the particular size of pipe to be welded. The overhanging flanges 37 retain the collar 35 in engagement with the jaws 24, 25, as shown in FIG. 4.

As best shown in FIG. 5, the support tube 20 has a ring-shaped race 40 mounted along the upper end face thereof. Cooperating with the race 40 is a plurality of ball bearings 41, which in turn cooperate in a like manner with the underside of the annular top wall 22, thus forming the other race of a bearing assembly. It will be noted that the cylinder 21 is thus held in position in the axial direction or along the vertical axis by the weight thereof. At the lower peripheral edge of the cap 21 are mounted a plurality of radially acting bearing units 45 that serve to stabilize the cap 21 in the radial or lateral direction. The rigid structure of the cap 21 and these bearings around the rigid support tube 20 give an extremely stable turn-table on which the pipe P may be clamped and welded.

Around the peripheral lower end of the cap 21 is also fixedly mounted a drive chain 50 to present a suitable means on the cap 21 to apply driving force from sprocket 51 and drive motor 52 (see FIG. 2). The drive chain or equivalent structure with lateral connecting links is preferred to other types of drive components, such as gears, since the sprocket teeth of the sprocket 51 are operative to engage the sides of the links of the chain 50 and thereby hold the cap 21 in a captive position in the axial direction on the support tube 20.

Now to consider set-up for welding, the flexible pipe P, having accordion-like pleats along its length and a protective sheath of woven metal fabric 60 with upper retaining collar 61 therefor, may be inserted through the clamp C in an upright position and along a substantially vertical axis. In other words, the pipe P to be welded is first threaded from the lower portion of the support tube 20 and extended through the opening 23 in the cap 21 and secured in the clamp C. To facilitate this set-up process, the front of the tube 20 along the lower portion thereof has an arch-shaped cutout 65 (FIGS. 1 and 5) to allow the operator to easily extend and control the flexible pipe P for insertion between the jaws 24, 25 of the clamp C. Also, the cutout 65 allows the pipe P to assume a more gradual change in direction, i.e., the intermediate angular section $P_1$ is allowed to be curved over a larger radius (see dotted line outline in FIG. 1) so that relatively stiff pipe may be accommodated with ease.

An extension E in the form of a threaded nipple (see FIG. 4) is to be welded on the end of the pipe in the embodiment illustrated in the drawings, although it is to be understood that other types of couplings or even other lengths of pipes may be similarly welded in accordance with the inventive teachings. This pipe extension E is freely positioned in face-to-face contact on the flat upper end face of the pipe P without being secured by an outside clamp and without first tack welding, which was not possible with the prior art methods described.

In accordance with the present invention, the excess length of the pipe P is left extending from the bottom of the fixture 10 at an angle and is thus no longer a hindrance to successful welding. This is so since the end of the pipe being welded, the intermediate angular section $P_1$ and the opposite end of the pipe $P_2$ resting in horizontal position on the floor F are all rotated in unison, as denoted by the rotational arrows in FIG. 1. That is, pipe having a length greater than the distance between the horizontal surface, such as the floor F, and the end to be welded, offers no hindrance to the automatic rotation of the pipe since the section $P_1$ and end $P_2$ are responsive to rotation. This discovery allows the use of the simple method of mechanically rotating the pipe at a constant speed and results in gaining a uniform weldment. As will be realized, the length of pipe that may be successfully welded is limited only by the space of the room in which the fixture 10 is located and is not dependent upon the axial dimensions of the fixture itself or the height of the fixture above the floor F. If necessary or desirable, several angles or angular sections may be formed in the pipe without effect on the efficiency of the welding.

The stand 11 is designed for the welding operator to mount the platform 13 during the welding operation. The operator may be suitably situated on a stool supported by the platform so that he is relaxed and so that he has the weld area of the pipe P in the most favorable work position directly in front of him at the most favorable working level. Furthermore, an annular table 66 of wood or other nonconducting material is provided upon which the operator can rest his arms for steadying while welding. As shown in FIG. 1, the table 66 is suitably supported from the tube 20 by upstanding arms 67 and an arcuate shield 68 may be positioned around the edge of the table (also insulated by coupling only to table 66) to offer shielding of the bright flash of the welding operation from the eyes of fellow employees approaching the fixture from the front or sides. The operator, comfortably seated on the platform 13, may operate at will the welding equipment with a conventional foot-operated switch (not illustrated) and the motor 52 with another conventional switch (also not shown in the drawings).

The type of actual welding operation to be employed with the fixture 10 of the present invention is of course determined by the nature of the metal or plastic material of the pipe P and the coupling E. The most common welding technique is electrical arc welding, and in this case, the ground to the pipe P is obtained through the fixture 10 and the stand 11. Thus, the weld rod or heat generator R is brought into proximity to weld area A and a uniform bead of weld material B from the rod R is deposited as the pipe P and the extension E rotate at a constant speed. The rod R may be advantageously held stationary and the rotation solely relied upon to give the uniform bead of material B.

When welding plastics it is to be understood that the weld rod R may represent an ultrasonic generator to form the weld bead by causing the abutting material of the two parts to flow together, or the rod R may alternatively be a dispenser of plastic weld material. Also, a separate weld rod or flux apart from rod or heat generator R may be easily used with the present inventive method when welding either metal or plastic since the other hand of the operator is free.

In some instances, it is desirable to weld relatively large diameter pipe, as represented by the pipe PP illustrated in FIG. 6. Since the pipe is thus too large to be held in the clamp C, a special adaptor in the form of a pedestal including an upstanding support rod 70 and supporting base 71 is utilized in accordance with another feature of the present invention. The support rod 70 is sized to conveniently fit within the clamp C, and thus upon rotation of the cap 21, the base 71 will be rotated in a suitable fashion. In the specific arrangement shown, the length of pipe PP has had flanged coupling 72 welded thereto along with weld bead $B_1$, as illustrated. In order to assure against possible accidental displacement of the coupling 72 on the base 71, suitable securing bolt and nuts 74 may be provided. After the flange 72 has been welded, the pipe PP is turned upside down and the collar 75 at the opposite end may be welded in a like fashion.

In a instance where the large diameter pipe PP has an extended length, and it is thus necessary to form an intermediate angular section $PP_1$ and allow excess pipe to rest in a horizontal position, as at $PP_2$ (note dotted line outline of FIG. 6), it is advantageous to provide an overhead horizontally extending trough 76. The trough may have suitable rollers 77 along the forward edge thereof to permit easier turning of the pipe. Also, the sides of the semicylindrical trough are spaced by a diameter sufficient to accommodate the largest pipe, but nevertheless afford a confining function to protect against the pipe falling.

It will be understood that the large flexible pipe PP will be inherently stiffer and thus have certain increased resistance to bending and forming the angular section $PP_1$. This means that the coupling 72 must first be tack welded at spaced points around the pipe to resist the upward spring force of the pipe when installed on the base 71. Furthermore, the upward force must be resisted at the cap 21, and in this instance, the sprocket 51a is relied upon. This hold down function of the sprocket is accomplished by the side faces of the teeth engaging the lateral chain links 80. As shown in FIG. 6, the chain 50a may be optionally mounted adjacent the top of the cap 21.

In view of the foregoing description, it should now be apparent that a simplified and more efficient apparatus and method has been provided for welding any selected length of flexible pipe than has heretofore been available. The pipe P including intermediate angular section $P_1$ and the free end of the pipe $P_2$ are rotated without hindrance through constant and smooth flexure of said angular section $P_1$ so that a uniform weldment is obtained. The cylinder or cap 21 of the welding fixture 10 is securely mounted by bearings 41, 45 for complete axial and lateral stability that assures accurate rotation and presention of the weld area A so that the leakproof, uniform weld can be made. When welding large diameter pipes, such as pipe PP (FIG. 6), a pedestal is utilized to thus make the machine capable of operating on virtually any size flexible pipe—in diameter, as well as length.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

We claim:

1. A method of welding a pipe extension to a prefabricated, flexible elongated pipe comprising the steps of supporting one end of said pipe to be welded upright along a substantially vertical axis, forming an intermediate angular section in said pipe, positioning the extension at said one end to define a peripheral weld area, rotating said pipe to turn both ends and the intermediate angular section at substantially constant speed, said angular section being subjected to rotary flexure by said rotating step, and applying a bead of weld material in the weld area around the periphery of the pipe during rotation whereby a uniform weldment is obtained and extended length of pipe may be welded.

2. The method of claim 1 wherein the free end of said pipe is positioned along a horizontal surface and said angular section extends through substantially 90°.

3. The method of claim 1 wherein is further provided the step of freely standing said pipe extension in upright position and in face-to-face contact on said one end of said pipe, whereby clamping of said extension in position to be welded is not required.

4. The method of claim 1 wherein the weld rod performing the welding operation is held stationary, whereby the rotating action of said pipe solely applies the uniform bead of weld material.

5. The method of claim 1 wherein is further provided the step of holding said pipe against substantial axial movement.

* * * * *